3,259,292
FASTENER DRIVING APPARATUS
George A. Maynard, Warwick, R.I., assignor to Bostitch, Incorporated, East Greenwich, R.I., a corporation of Rhode Island
Filed Mar. 17, 1964, Ser. No. 352,494
21 Claims. (Cl. 227—8)

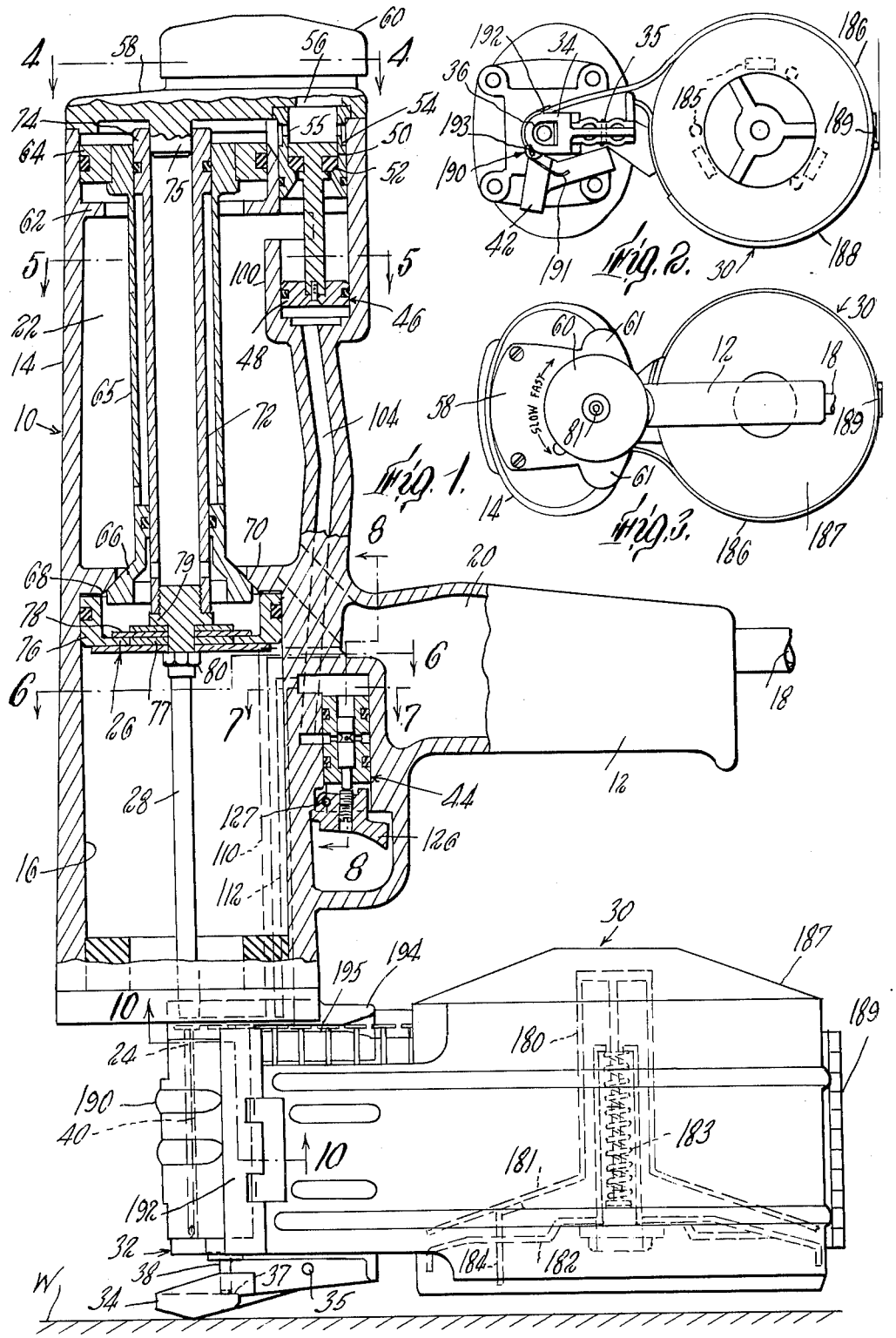

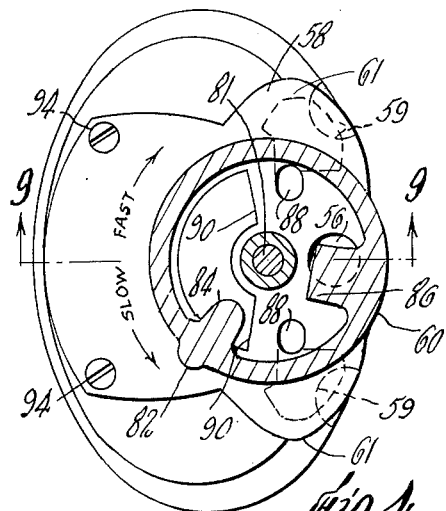
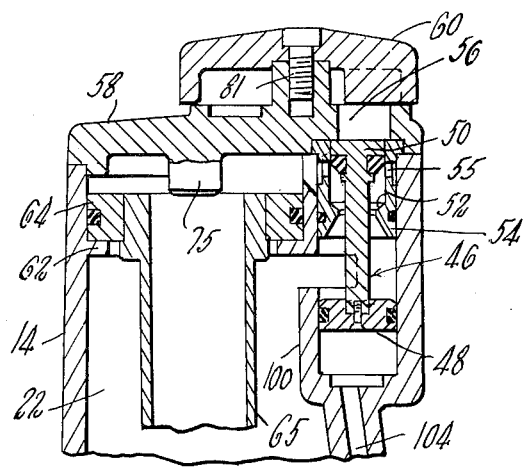
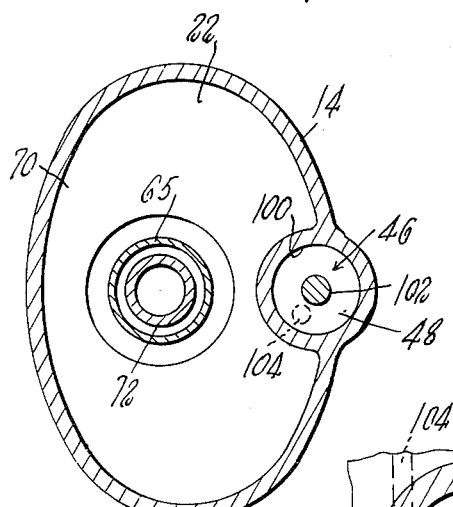
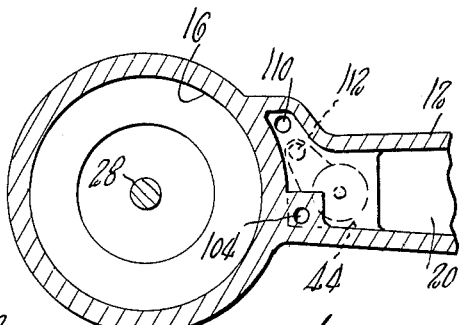
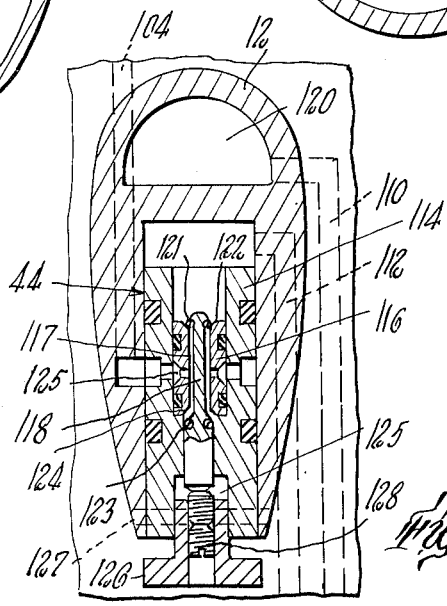
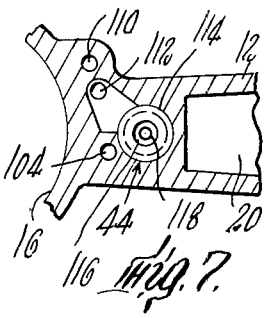

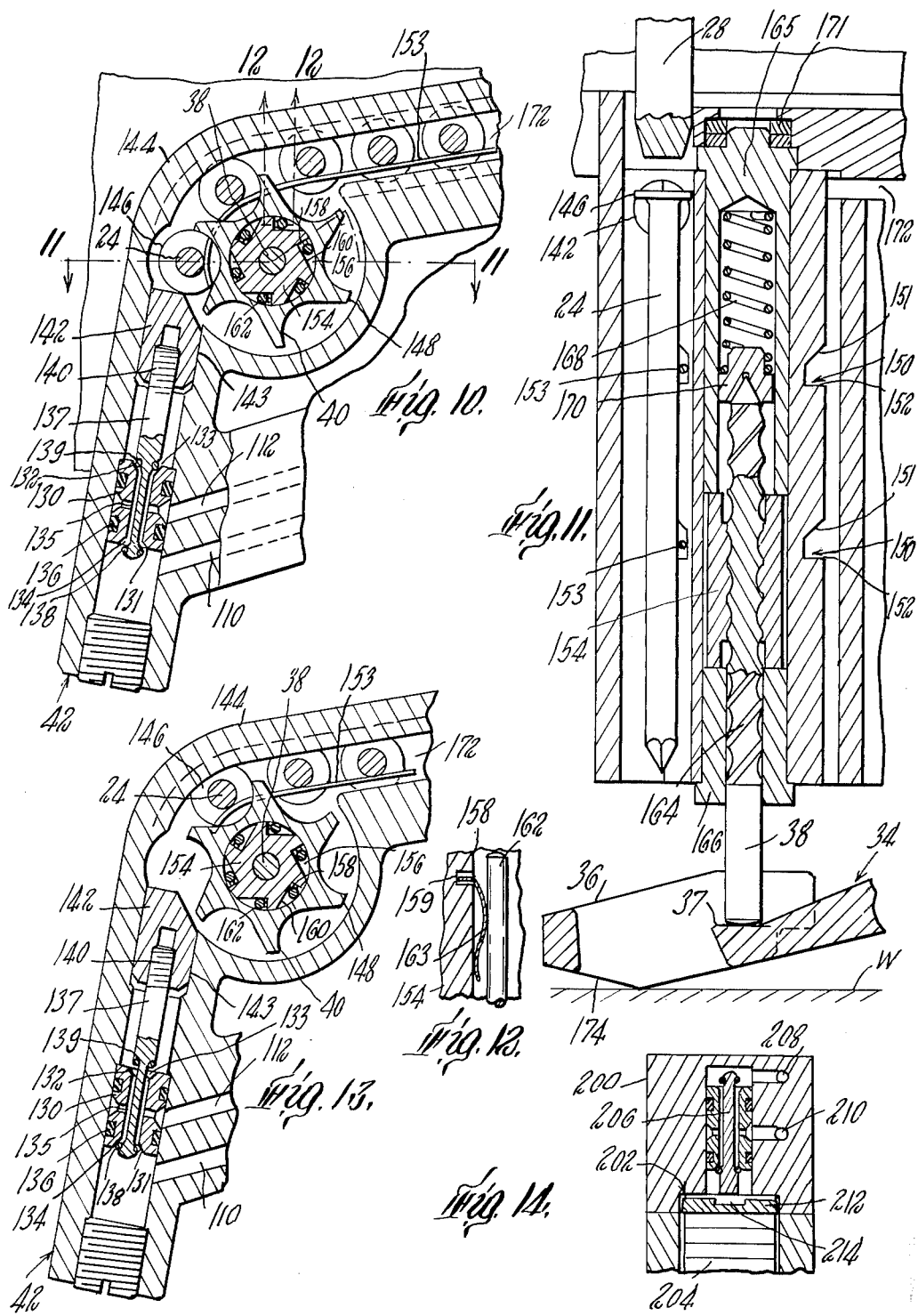

This invention relates to fastener driving apparatus, and more particularly to apparatus for driving fasteners fed from a magazine into a workpiece.

A wide variety of magazine-fed fastener driving apparatus are well known, as for example, the desk type of stapler. The advantages of speed and convenience of operation of such apparatus have been extended to heavier duty apparatus for driving larger fasteners. It would be advantageous to employ similar techniques in the driving of still larger fasteners such as eightpenny nails which are widely used in construction projects for such purposes as framing and the laying of subflooring. In the driving of such fasteners, it is desirable that they be driven into place in a single blow, and for this purpose a large driving force should be available for reliably driving the fastener the desired depth into wood or other substances of varying density. Where pneumatic actuation is employed, the apparatus preferably is designed so that a large volume of air may be transferred rapidly without excessive pressure drop to provide the energy necessary to deliver the blow of desired magnitude to the fastener driver while not exhausting a large amount of air to the atmosphere during each stroke. It is also desirable that driving apparatus accommodate fasteners of conventional configuration so that special approval in compliance with building codes is not required for their use. In the case of nails, the driving apparatus should accept the conventional circular head type nails and not be limited to a non-standard head configuration, for example, such as the type employed when the nails are connected together in a "stick" with their shanks in contact.

Accordingly, an object of the invention is to provide novel and improved driving apparatus capable of handling nails of conventional configuration.

Another object of the present invention is to provide a new and improved pneumatically operated fastener driving apparatus.

A further object of the invention is to provide a novel and improved pneumatically operated fastener driving device of controllable cycling rate.

Still another object of the invention is to provide a fastener driving device having new and improved control means for preventing operation of the apparatus unless the fastener discharging portion thereof is disposed immediately adjacent the workpiece. This object is of particular importance in connection with heavy-duty driving tools of the type suitable for driving eightpenny nails, for example, due to the hazards involved, as such a tool is capable of firing a nail at speeds sufficient to cause physical injury.

Further, where it is necessary to develop driving forces of large magnitude, there is substantial wear on the operating parts, and another object of the invention is to provide a tool which prevents unnecessary cycling of the driver, as, for example, when the supply of fasteners in the magazine is exhausted.

Still another object of the invention is to prevent driving operation should a fastener not be positioned properly in alignment with the driver as, for example, contact of the driver with such a fastener or other structure not in proper alignment could result in major damage of the tool and also possible injury to the operator.

Still another object of the invention is to provide a novel and improved fastener feeding mechanism for use in a fastener driving device.

A further object of the invention is to provide a fastener driving apparatus providing greater versatility in operating characteristics.

In accordance with these and other objects of the invention, an embodiment of the invention in the form of a nailer comprises a housing having a head portion and a rearwardly extending handle portion, together with a magazine portion secured to the base of the housing. The housing includes a fluid pressure reservoir chamber and a piston cylinder having a driver piston slidably mounted therein with a fastener driving element secured thereto. A drive track, aligned with the driving element, receives nails in sequence from a magazine for driving by the driving element.

The magazine may take several forms, but in this embodiment, it includes a container having a floor member, the positioning of which may be adjusted to accommodate different lengths of nails. A coil of conventional, round-headed nails, secured together, for example, in accordance with the teaching of Peterson Patent No. 3,083,369, may be positioned in the magazine, and the nails are fed therefrom by an advancing mechanism positioned adjacent the drive track.

This nail advancing mechanism is operated in response to contact with the workpiece of a shoe carried by the magazine and located below the drive track. Such contact operates the advancing mechanism to position a nail in alignment with the drive track. An interlock valve is located adjacent the drive track, and when a nail is properly positioned relative to the drive track by the advancing mechanism, that nail operates the interlock valve for supplying pressure fluid from the reservoir to a manually actuable control valve for operation of the driver apparatus. Thus, the fastener to be driven is, itself, an active member in the driver control system.

The driver control includes a main valve which, in a heavy-duty nailer embodiment, is controlled by a pilot valve. The main valve controls flow of fluid from the reservoir to the main cylinder for acting on the driver piston and opens a larger passage so that the pressure drop between reservoir and cylinder is minimized. The pilot valve has two valving positions, a first one in which a pressure surface of the main valve is connected to the atmosphere through a passage of adjustable dimension and a second one in which that pressure surface of the main valve is connected to the reservoir. Application of control fluid to the pilot valve is controlled by the conjoint operation of the interlock valve and a manually actuable control valve.

The control valve is connected in the system in series with the interlock valve and, when both are actuated, couples pressure fluid from the reservoir to the pilot valve. The pilot valve then operates and connects the reservoir to the main valve so that the fluid pressure drives the main valve in a direction to open the cylinder to fluid pressure from the reservoir which forces the driving element downwardly in a nail driving operation. As indicated above, this operation cannot be initiated unless a nail is in proper position in the drive track. Also, the advancing mechanism allows movement of the fastener out of the drive track sufficient to release the interlock valve when contact of the shoe with the workpiece is broken.

The nail advancing mechanism in addition to positioning the nail for driving serves to guide the nail substantially the length of the driving stroke, and that single stroke drives the nail into the workpiece. The length of the drive stroke is proportioned to the length of the drive track so that the drive operation also resets the feed mechanism.

As soon as the nail is moved out of contact with the interlock valve, that valve is released and it operates to dump the pilot fluid and initiate the return cycle of the driving element to its starting position. The duration of the return cycle is controlled by the setting of a choke relative to the exhaust passage and enables the operator to vary the cycling speed of the tool to suit the nature of his work.

This fastener driving apparatus is a powerful and versatile tool. Among its other features is the fact that it enables the operator to employ several different techniques in the driving of fasteners, for example, straight nail driving or toe nailing. Also, through use of the exhaust passage control, the driver recycle rate may be adjusted so that nails may be accurately located and driven with precision under manual control. Another mode of operation results where the manually actuable control valve is held open and the tool is operated by contacting the shoe with the workpiece at the desired point, such contact initiating the driving of a fastener. Still another mode of operation may be termed "drag firing," in which the manual control valve is held open and the driver apparatus is held firmly in contact with the workpiece while being moved along the workpiece. A series of nails are then driven at a rate determined by the setting of the exhaust passage choke. The driving and recycling operations are automatically terminated if a nail should jam or become misaligned or when the supply of nails becomes exhausted. Further, a nail cannot be driven unless the shoe member is in firm contact with the workpiece, a safety feature of some importance as a pneumatically actuated driver of this power can discharge a nail with sufficient force to cause physical injury.

Other objects, features and advantages of the present invention will be seen as the following detailed description of a preferred embodiment and modifications thereof progresses, in conjunction with the drawings, in which:

FIG. 1 is a side elevational view, partly in section, of a nail driving apparatus constructed in accordance with the invention;

FIGS. 2 and 3 are bottom and top views, respectively, of the driving apparatus shown in FIG. 1 drawn to a smaller scale than FIG. 1;

FIGS. 4–7 are a series of sectional views taken along the lines 4—4, 5—5, 6—6, and 7—7, respectively, of FIG. 1;

FIG. 8 is a sectional view of the control valve assembly taken along the line 8—8 of FIG. 1 to an enlarged scale;

FIG. 9 is a sectional view of the pilot valve assembly similar to FIG. 1, showing that valve in a second position;

FIG. 10 is a sectional view of the interlock valve and feed mechanism taken along the line 10—10 of FIG. 1 to an enlarged scale;

FIG. 11 is a sectional view taken along the line 11—11 of FIG. 10;

FIG. 12 is a sectional view of a clutch pin and bias spring taken along the line 12—12 of FIG. 10;

FIG. 13 is a sectional view similar to FIG. 10 showing the components of the interlock valve and feed mechanism in a second position; and FIG. 14 is a diagrammatic view of a modified safety interlock valve for use in a faster driving apparatus of the type which drives staples.

The apparatus shown in FIG. 1 is a pneumatically operated nailer capable of handling eightpenny nails and driving such nails in a single stroke. The nailer includes a housing 10 having a handle portion 12 and a head portion 14. A driving cylinder 16 is disposed in the lower end of head portion 14. Compressed air is supplied through orifice 18 into a first reservoir chamber 20 in handle 12 which is in direct communication with a second reservoir chamber 22 in the upper part of head portion 14.

The apparatus directly acting on a nail 24 includes a piston 26 mounted in the cylinder 16 to which is attached a driver rod 28.

Bolted to the base of the housing as an assembly is a nail magazine 30 and a nosepiece portion 32 in which is formed a drive track. Secured at the base of the nosepiece-magazine assembly is a workpiece contact element in the form of shoe 34 which is mounted for rotation about pivot 35. This contact element defines an aperture 36 through which the nail is driven and includes surface 37 against which is biased shaft 38 which cooperates with a nail feeding turret element 40, as diagrammatically indicated in FIG. 1.

The feed mechanism, when actuated, moves a nail into alignment with the driver rod 28, and when the nail is properly positioned, it actuates an interlock valve element mounted in valve housing 42 (FIG. 2) which opens a passageway between the first reservoir 20 and the manually actuable control valve assembly 44. Concurrent actuation of that assembly with the interlock valve allows pilot air to flow to the pilot valve assembly 46 which includes a piston element 48 and a valve element 50 which is normally positioned in sealing relation on conical seat 52 in sleeve 54. That sleeve has a plurality of orifices 55 in its side wall and an exhaust orifice 56 at its upper end. This pilot valve controls the flow of air to and from the uppermost part of the head portion through orifices 55. The valve sleeve is secured in the housing 10 by means of cap 58 which is bolted to the housing in conventional manner. The housing has two exhaust ports 59 and the cap includes cooperating exhaust deflector portions 61. A rotatably adjustable cover 60 is mounted on the cap in overlying relation to the exhaust deflector portions and controls the flow of exhaust air to those portions.

In the upper part of reservoir chamber 22 is disposed an inwardly extending flange 62, and positioned above that flange is piston member 64 which carries a depending hollow valve stem 65 having valve member 66 formed at its lower end. This valve member 66 mates in sealing relation with a downwardly facing valve seat 68 which is formed on an inwardly extending annular flange 70 which separates the driver cylinder 16 from the second reservoir chamber 22 in the head portion 14. Piston 64 and valve member 66 are limited in their downward movement by flange 62.

Coaxially disposed within valve stem 65 is a piston rod 72 which has a return piston 74 formed at its upper end and which is threadedly secured to the driver rod 28 at its lower end. Piston rod 72 is also hollow, and when the drive piston 26 is in its return position, its upper end engages stop 75 formed integrally with cap 58.

Piston 26 is of laminated construction, having an annular magnesium piston body 76 spaced from drive rod 28 by steel spacer 77. A series of spring steel washers 78 are disposed on either side of piston body 76 and spacer 77 and are secured in stacked relation against flange 79 by nut 80.

Additional details of the structure will be seen with the reference to the sectional views 4–13. In FIG. 4 there is shown a section through the cover 60 which is rotatably mounted on the cap 58. This cover 60 is secured by suitable means such as bolt 81 and includes integrally formed handle portion 82, stop tab 84 and choke tab 86. Both tabs extend inwardly from its periphery. The housing cap 58 has integrally formed therein two deflector channel 88, two stop surfaces 90 which cooperate with tab 84, and an exhaust orifice 56, the effective area of which is determined by its cooperation with tab 86. In the position of the cover 60, as shown, orifice 56 is almost completely closed by tab 86 and the tool is in a slow cycle mode of operation. Should the cover 60 be rotated in a clockwise direction from the position shown in FIG. 4, a larger area of the orifice 56 will be exposed and the cycle speed of operation will be increased. Bolt 81 locks the cover 60 and choke tab 86 in its adjusted position relative to exhaust orifice 92. Bolts 94, used for securing the cover on the housing, are indicated diagrammatically.

The section shown in FIG. 5, taken along the line 5—5 of FIG. 1, indicates the oval shape of the reservoir chamber 22 (providing a large volume of air for driving purposes) and the offset location of the pilot valve assembly 46. That assembly includes piston 48 which is disposed in cylinder portion 100 and which is connected to valve element 50 by pilot valve stem 102. At the base of cylinder 100 is an orifice of the pilot air passageway 104. The configuration of the port in flange 70 which divides the upper reservoir chamber from the lower cylinder chamber is indicated in FIG. 5.

The section shown in FIG. 6 is through the cylinder chamber 16, a portion of the housing for the control valve 44, and the handle portion 12. Indicated in that figure is the location of pilot air passageway 104, a first passageway 110 that extends between the reservoir and the safety interlock valve in housing 42, and a second or return passageway 112 which extends between the interlock valve housing and the control valve assembly 44. The sectional view of FIG. 7 indicates the relative locations of the reservoir passageway 110 and the return passageway 112 and the direct communication between passageway 112 and the control valve assembly 44. As indicated in this figure, the control valve assembly 44 includes a sleeve 114 in which is disposed a valve body 116 having an axially extending passageway 117 in which is disposed a valve rod 118.

The sectional view of FIG. 8 indicates details of the control valve structure and its relationship to the handle and passageways 104, 110, and 112. A large unvalved passageway 120, located immediately above the control valve chamber, connects the first reservoir chamber 20 in the handle 12 with the second reservoir chamber 22 in the head portion 14. Passageway 110 is in direct communication with passageway 120. The upper end of the control valve chamber is in communication with the return passageway 112, and when pressure is applied through that passageway, the valve rod 118 is forced down to seat O-ring 121 on valve seat 122. At that time O-ring 123 is spaced from seat 124 so that passageway 104 is connected to the atmosphere through valve body orifices 125.

The trigger 126 and sleeve 114 are secured to the housing 10 by pin 127. The trigger 126 carries a pair of set screws 128 which lock against each other with the upper one adapted to engage rod 118. Upon pivoting movement of the trigger 126, rod 118 is moved upward to seat O-ring 123 and open the valve at seat 122. Air can then flow past seat 122 and through orifice 125, and passageway 112 is then in direct communication with the pilot air passageway 104.

The third control element in the pneumatic system is the safety interlock valve housed in chamber 42. This valve, as shown in FIGS. 10–13, is a three-way valve structure substantially identical with the control valve and including a valve body 130 having two valve seats 131, 132, end ports 133, 134, and a central port 135. O-rings 136 seal the valve body ports from one another. The valve rod 137 has two O-rings 138, 139 which alternately engage seats 131, 132, respectively. Air pressure from the reservoir normally biases the valve rod 137 to a position in which return passageway 112 is in communication with the atmosphere. The valve rod end 140 threadedly receives a plunger 142 which is mounted for reciprocating movement in housing bore 143 toward and away from turret housing 144. Inward movement of plunger 142, in the order of 0.030 inch, operates the three-way valve to connect passageway 110 to passageway 112 and to cause O-ring 139 to engage seat 132.

The safety interlock valve is actuated by the head 146 of a nail 24 when the nail is moved into contact with the plunger 142 by the turret 40 which is similar in form to a star wheel and has six radially extending flanges 148 which form elongated, axially extending, cylindrically walled pockets that receive and guide the heads 146 of the nails. Each turret flange also has two grooves 150 which are disposed in circumferential alignment with corresponding grooves in the other flanges. Each groove has an inclined upper surface 151 for guiding purposes and a lower radially extending surface 152 for cutting purposes. Wires 153 secured to the nails 24 are received in these grooves and secured there by the wall of the turret housing as the turret is rotated.

The turret is mounted on a one-way clutch structure which includes a nut 154 having a series of axially extending grooves 156 about its periphery. Each groove in has a slot 159 therein and a generally tangentially extending surface 160. Disposed in each groove is a clutch pin 162 and a leaf spring 163, one end of which is secured in slot 159 and biases pin 162 along surface 160 away from surface 158. The inner bore of the nut has threads that engage cooperating threads 164 on shaft 38.

This clutch structure is retained inside turret 40 by bushings 165 and 166. A spring 168, housed within upper bushing 165 engages shaft cap 170 and biases the shaft 38 downwardly. A thrust bearing in the form of washers 171 is disposed above bushing 165.

The clutch structure is housed within turret 40 and the nails are fed into the turret from the magazine through track 172. The nails 24 are secured together in series by two wires 153 in a nail assembly configuration of the type shown in the Peterson Patent 3,083,369, and these wires are received in turret grooves 150, as indicated above.

When shoe 34 engages the workpiece W, it pivots and forces shaft 38 upward against the biasing force of spring 168. As the nut 154 is restrained against axial movement by bushings 165, 166, it must rotate. This rotation forces the clutch pins 162 out along the tangential groove surfaces 160 and into engagement with the inner surface of the turret bore. When so engaged, further axial movement of the shaft 38 rotates the turret, and the nails, whose heads are disposed in the turret pockets between flanges 148, are advanced into the drive track and into alignment with the driver rod 28. When the nail head 146 contacts plunger 142 and moves it into bore 143 about $\frac{1}{32}''$, the interlock valve is fully actuated and acts as a positioning stop. In this position the nail is aligned with the driver through the coaction of the turret pocket and the positioning function of the valve.

In operation of the apparatus, after the magazine is loaded, the feeding of nails 24 into drive position is accomplished by rotation of the feed barrel turret 40 in response to the pressing of contact trip member 34 against the workpiece W. This pushes shaft 38 upwardly against the spring 168 and rotates nut 154 to advance the turret in the counterclockwise direction to the position shown in FIG. 10 to advance a nail 24 into drive position. In drive position the head 146 of the nail is in contact with plunger 142 of the safety interlock valve and has operated that valve to connect passage 110 with passage 112 and supplies air to the control valve assembly 44. (Should a nail not be properly moved into position, the interlock valve will not be actuated and no air pressure would be applied to the control valve assembly.)

If the control valve 44 is actuated concurrently with the interlock valve, the air pressure in passageway 112 will be connected through axial passageway 117 and ports 125 to pilot valve passageway 104 to act against the pilot valve piston 48 and move that piston upward to change the valve 50 from contact with seat 52 to open orifices 55 to the reservoir after exhaust port 56 is closed (in the position shown in FIG. 9). In this position, air from reservoir chamber 22 flows through sleeve orifices 55 into the chamber above the main valve piston 64 and forces it down. The movement opens the main valve 66, and the full reservoir pressure acts against drive piston 26 so that the piston 26 and driver 28 are moved down rapidly to drive the nail 24 into the workpiece W.

As soon as the nail head 146 has been moved off the plunger 142, the plunger is moved by air pressure and the interlock valve closes passage 110 and connects passage 112 to the atmosphere. This dumps the pilot air through the valve 42 to atmosphere, and the pressure differential across piston 48 forces the valve 50 down onto seat 52 so that the chamber above piston 64 is connected to atmosphere through exhaust orifice 56.

The main valve 66 is then returned to the sealing position shown in FIG. 1 at a rate controlled by the setting of choke tab 86. At the same time, reservoir pressure is acting against the lower surface of return piston 74, while its upper pressure surface is vented to atmosphere. When the main valve 66 closes, this pressure differential moves piston 74 (and driver piston 26) up so that the drive piston 26 is returned to its starting position. Stop 75, carried by the cap 58, acts as a cushion and controls the final positioning of the main drive piston 26. Additional details of this type of driver mechanism are shown and described in Smith Patent No. 3,051,135.

When the driver blade 28 is at the bottom of its stroke, it extends through the nosepiece and contact shoe a distance sufficient to push the nosepiece away from the workpiece W. This allows the spring 168 to push the screw shaft 38 downwardly and return the contact trip shoe 34 to its starting position. As soon as the driver 28 has returned far enough to disengage itself from the nail feeding turret 40, the nosepiece may be pushed down against the workpiece to feed another nail into drive position so that the drive cycle may be repeated.

Should the control valve 44 be held in its actuated position and the tool be maintained against the work, the tool will automatically recycle and drive a sequence of nails. As indicated above, the speed of this automatic recycle may be varied by control of the main exhaust port 56 with the choke tab 86.

Further, it will be noted that the driver cannot be operated unless the interlock valve is held open by the fastener, and since the fastener is moved into position only when the contact trip shoe 34 is firmly pressed against the workpiece, the tool has the safety feature of not being able to be fired unless the shoe is in proper contact with the workpiece. Should the tool not be fired after the nail is properly positioned in the drive track by the contact trip shoe and the interlock valve opened, release of contact trip shoe 34 will release turret 40 and the interlock valve will be closed by the pressure in line 110, the nail being moved out of proper position as the interlock valve closes. The shoe has front and side edges beveled (as indicated at 174) so that toe nailing operations are facilitated. Further, if the supply of fasteners is exhausted or if a fastener has not been advanced fully into drive position, the tool cannot be operated. Thus, in addition to the safety features, the apparatus reduces the possibility of jamming and also extends the effective operating life of the tool.

As indicated in FIGS. 1–2, the magazine 30 receives a coil of conventional roundheaded nails 24 which are suitably secured together in series as with wires 153. The magazine includes a central post 180 secured to conical floor member 181 on which the pointed ends of the nails rest. This unit is biased downwardly toward base member 182 by spring 183 mounted within post 180. Spacers 184 carried by floor 181 cooperate with slots 185 in base 182 enabling the height of floor 181 to be varied so that different lengths of nails may be driven by the apparatus.

The magazine side wall 186 and cover 187 are secured together as a unit and hinged to a second side wall 188 by angularly disposed hinge 189. A latch 190 surrounds the nosepiece and has a handle 191 and a latch surface 192. A torsion spring, mounted on pivot pin 193, biases the latch to closed position, securing the end of side wall 186 in closed position.

Nails are advanced from the magazine by operation of the turret through a track in which the nail heads 146 are located between entrance guide 194 and nail head support ledge 195. The nail heads are thus fed in proper position by the turret 40 for actuation of the interlock valve nail sensor (plunger 142). In this apparatus the nails are advanced from the magazine by the turret alone. Auxiliary or alternative advancing mechanisms may be employed as desired, particularly where other forms of nail packages are employed.

While a nail driving embodiment of the invention has been described in detail, features of the invention are not limited to nail driving devices, but are also useful in the driving of other types of fasteners, such as corrugated fasteners or staples. For example, an interlock valve arrangement may be incorporated in a staple driving tool as indicated in diagrammatic form in FIG. 14. As shown in that figure, there is provided a nosepiece 200 in which is formed a drive track 202. A magazine structure is positioned adjacent the nosepiece and may be moved away from and towards the nosepiece, for example, in a sliding movement. A series of staple fasteners 204 are fed, by suitable means such as a spring, serially into the drive track formed in the nosepiece. When a staple is properly aligned in the drive track, interlock valve 206 is actuated to connect reservoir passage 208 to passage 210 which is connected, for example, to the control valve assembly. (Such assembly may be omitted, if desired, in particular applications.) In such position, the driver 212 may be actuated to drive the staple positioned in the drive track into the workpiece. It will be noted that a slot 214 is provided in the driver, and as soon as the driver moves the staple out beyond the valve 208, the valve is released to interrupt the connection between passages 208 and 210 and connect passage 210 to atmosphere via the drive track 202. The next staple cannot be fed into the drive track until the driver 212 is returned to its starting position.

Often fastener driving arrangements, based on features of the disclosed embodiments, will be obvious to those of ordinary skill in the art. Therefore, it is not intended that the invention be limited to the disclosed embodiments or to details thereof and departures may be made therefrom within the spirit and scope of the invention as defined in the claims.

What is claimed is:

1. Apparatus for driving fasteners into a workpiece comprising fastener driving means including a driver element,
   structure defining a drive track for slidably receiving a driver element,
   means for positioning a fastener in said drive track,
   control means for operating said fastener driving means to move said driver element through said drive track, and
   interlock means for sensing the proper positioning of a fastener in said drive track, said interlock means enabling actuation of said operating means in response thereto.

2. The apparatus as claimed in claim 1 and further including means responsive to the positioning of said apparatus adjacent a workpiece for advancing a fastener into alignment with said driver element.

3. The apparatus as claimed in claim 2 wherein said interlock means moves the fastener out of proper position with respect to said driver element when said apparatus is moved away from the workpiece.

4. The apparatus as claimed in claim 1 and further including a reservoir for pressure fluid, and wherein said control means includes a main valve for controlling the action of pressure fluid in said reservoir against said fastener driving means and said interlock means includes a valve operative when a fastener is positioned in alignment with said driver element to control the actuation of said main valve.

5. Apparatus for driving fasteners into a workpiece comprising fastener driving means including a driver element, structure defining a drive track for slidably receiving a driver element, means for positioning a fastener in said drive track, a reservoir for pressure fluid, and control means for operating said fastener driving means to move said driver element through said drive track, said control means including a main valve for controlling the action of pressure fluid in said reservoir against said fastener driving means, a fluid actuated pilot valve for controlling the actuation of said main valve, interlock means enabling actuation of said fastener driving means in response to the proper positioning of a fastener in said drive track, and means for applying pressure fluid to said pilot valve for actuating said main valve to apply pressure fluid from said reservoir to move said driver element in a fastener driving operation.

6. The apparatus as claimed in claim 5 wherein said interlock means includes a valve operative when a fastener is positioned in alignment with said driver element to control the flow of fluid to said pilot valve.

7. The apparatus as claimed in claim 6 wherein said control means further includes manually operable means for controlling the application of fluid to said pilot valve.

8. Apparatus for driving fasteners into a workpiece comprising fastener driving means including a reciprocable driver element, a magazine for storing a supply of fasteners, structure defining a drive track for receiving a fastener from said magazine and aligning said fastener with said driver element, control means for operating said fastener driving means to move said driver element through said drive track to drive the fastener disposed in said drive track into a workpiece in a single stroke, and fluid pressure means responsive to the movement of a fastener through said drive track for retracting said driver element from said drive track after completion of said stroke independently of the position of said control means.

9. Apparatus for driving fasteners into a workpiece comprising fastener driving means including a reciprocable driver element, a magazine for storing a supply of fasteners, structure defining a drive track for slidably receiving said driver element, control means for operating said fastener driving means to move said driver element through said drive track, fluid means responsive to the movement of said driver through said drive track for retracting said driver element from said drive track independently of the position of said operating means, and adjustable means for controlling the speed of retraction of said driver element from said drive track.

10. The apparatus as claimed in claim 9 and further including a reservoir for pressure fluid, and wherein said control means includes a main valve for controlling the action of pressure fluid in said reservoir against said fastener driving means, a fluid actuated pilot valve for controlling the actuation of said main valve, and means for applying pressure fluid to said pilot valve for actuating said main valve to apply pressure fluid from said reservoir to move said driver element in a fastener driving operation.

11. The apparatus as claimed in claim 10 wherein said control means further includes interlock valve means operative in response to the positioning of a fastener in alignment with said driver element to apply fluid to said pilot valve, said interlock valve being released as the fastener is driven by said driver element.

12. The apparatus as claimed in claim 11 wherein said control means further includes manually operable means for controlling the application of fluid to said pilot valve.

13. Apparatus for driving fasteners into a workpiece comprising fastener driving means including a reciprocable driver element, structure defining a drive track for slidably receiving said driver element, means responsive to the positioning of said apparatus adjacent the workpiece for advancing a fastener into alignment with said driver element, control means for operating said fastener driving means to move said driver element through said drive track, and interlock means responsive to the proper alignment of a fastener with respect to said driver element for enabling actuation of said control means.

14. The apparatus as claimed in claim 13 wherein said fastener advancing means includes a rotatably mounted turret, said magazine includes a fastener passage having an outlet disposed adjacent said turret such that said turret advances a fastener received from said passage outlet into alignment with said driver element when said turret is rotated, and means responsive to the positioning of apparatus in contact with the workpiece to rotate said turret.

15. The apparatus as claimed in claim 14 wherein said turret has a plurality of elongated, axially extending pockets about its periphery, each said pocket being adapted to receive a fastener therein.

16. The apparatus as claimed in claim 14 wherein said turret rotating means includes a one-way clutch.

17. The apparatus as claimed in claim 13 wherein said workpiece responsive means includes a shoe member having a portion extending forwardly of said drive track.

18. The apparatus as claimed in claim 17 wherein said shoe has an aperture through which the fastener is driven.

19. Fastener driving apparatus comprising a housing defining a reservoir adapted to be supplied with compressed air through a supply orifice, a cylinder, and fastener driving means slidably mounted in said cylinder, valve means for closing said passage to block the flow of air between said reservoir and said cylinder, means supporting said valve means on said housing so that said valve means may be moved between a closed position and an open position, said valve means including a control surface, first and second passageways adapted to communicate with said control surface, means to adjust the effective cross sectional area of one of said passageways, and control valve means mounted on said housing for controlling flow of air from said reservoir to said control surface.

20. Fastener driving apparatus comprising a housing defining a reservoir adapted to be supplied with compressed air through a supply orifice, a cylinder, and fastener driving means in said cylinder including a reciprocable driver elements, a magazine for storing a supply of fasteners, structure defining a drive track for slidably receiving reciprocable driver element, main valve means for closing said passage to block the flow of air between said reservoir and said cylinder, means supporting said valve means on said housing so that said valve means may be moved between a closed position and an open position, said valve means including two opposed pressure surfaces, an exhaust passageway communicating with one of said pressure surfaces, means to adjust the effective cross sectional area of said exhaust passageway, a reservoir passageway communicating with said one pressure surface, pilot valve means for controlling the flow of air through said exhaust and reservoir passageways, an interlock valve for controlling flow of air from said reservoir to said pilot valve means, fastener advancing means mounted on said housing for advancing fasteners serially into said drive track, the fastener in said drive track adapted to move said interlock valve from a first position to a second position to apply pressure fluid to said pilot valve means to open said reservoir passageway, and said interlock valve being moved to said first position as the fastener is driven through said drive track to connect said pilot valve means to the atmosphere and open said exhaust passageway.

21. The apparatus as claimed in claim 20 wherein said means to adjust the effective cross sectional area of said exhaust passageway includes a choke member movable across said exhaust passageway, and means to lock said choke member in position relative to said exhaust passageway.

References Cited by the Examiner
UNITED STATES PATENTS

| | | | |
|---|---|---|---|
| 618,695 | 1/1899 | Lee | 227—117 XR |
| 1,030,220 | 6/1912 | Young | 227—8 |
| 3,023,413 | 3/1962 | Fischer et al. | 227—5 |
| 3,106,136 | 10/1963 | Langas et al. | 227—130 XR |
| 3,191,841 | 6/1965 | Schafroth | 227—130 |
| 3,198,412 | 8/1965 | Roosa | 227—8 |

GRANVILLE Y. CUSTER, JR., *Primary Examiner.*